United States Patent
Anvin et al.

(10) Patent No.: US 8,370,604 B2
(45) Date of Patent: *Feb. 5, 2013

(54) METHOD AND SYSTEM FOR CACHING ATTRIBUTE DATA FOR MATCHING ATTRIBUTES WITH PHYSICAL ADDRESSES

(76) Inventors: H. Peter Anvin, San Jose, CA (US); Guillermo J. Rozas, Los Gatos, CA (US); Alexander Klaiber, Mountain View, CA (US); John P. Banning, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/168,800

(22) Filed: Jun. 24, 2011

(65) Prior Publication Data
US 2012/0166703 A1    Jun. 28, 2012

Related U.S. Application Data

(63) Continuation of application No. 12/127,648, filed on May 27, 2008, now Pat. No. 7,979,669, which is a continuation of application No. 11/454,355, filed on Jun. 16, 2006, now Pat. No. 7,380,098, which is a continuation of application No. 10/613,801, filed on Jul. 3, 2003, now Pat. No. 7,089,397.

(51) Int. Cl.
*G06F 12/00* (2006.01)

(52) U.S. Cl. ............ 711/207; 711/3; 711/144; 711/156; 711/206

(58) Field of Classification Search .................. 711/207, 711/3, 144, 156, 206
See application file for complete search history.

(56) References Cited

U.S. PATENT DOCUMENTS

| | | |
|---|---|---|
| 5,946,716 A | 8/1999 | Karp et al. |
| 6,012,134 A | 1/2000 | McInerney et al. |
| 6,189,074 B1 | 2/2001 | Pedneau |
| 6,275,917 B1 * | 8/2001 | Okada ........................... 711/207 |
| 6,301,647 B1 | 10/2001 | Green |
| 6,304,944 B1 | 10/2001 | Pedneau |
| 6,351,797 B1 | 2/2002 | Beard, Sr. et al. |
| 6,631,447 B1 * | 10/2003 | Morioka et al. .............. 711/141 |
| 6,681,311 B2 | 1/2004 | Gaskins et al. |
| 6,711,653 B1 | 3/2004 | Quach et al. |
| 6,738,864 B2 | 5/2004 | Chauvel |
| 6,769,052 B2 | 7/2004 | Chauvel et al. |
| 6,779,085 B2 | 8/2004 | Chauvel |
| 6,826,670 B2 | 11/2004 | Middleton et al. |
| 6,839,813 B2 | 1/2005 | Chauvel |
| 6,889,330 B2 | 5/2005 | Chauvel et al. |
| 6,901,521 B2 | 5/2005 | Chauvel et al. |
| 7,712,098 B2 | 5/2010 | Chauvel et al. |
| 2003/0226014 A1 * | 12/2003 | Schmidt et al. ............... 713/164 |
| 2004/0193831 A1 | 9/2004 | Moyer |

OTHER PUBLICATIONS

Richardson et al., "Attribute Caches," WRL Technical Note TN-48, pp. 1-38, Apr. 1995.
Stallings, "Computer Organization and Architecture, Designing for Performance, 4th Ed.," "Section 7.3, Memory Management," pp. 240-251, Jan. 1996.

* cited by examiner

*Primary Examiner* — Stephen Elmore

(57) ABSTRACT

A method for caching attribute data for matching attributes with physical addresses. The method includes storing a plurality of attribute entries in a memory, wherein the memory is configured to provide at least one attribute entry when accessed with a physical address, and wherein the attribute entry provided describes characteristics of the physical address.

20 Claims, 6 Drawing Sheets

METHOD AND SYSTEM FOR CACHING ATTRIBUTE DATA FOR MATCHING ATTRIBUTES WITH PHYSICAL ADDRESSES

CROSS-REFERENCE TO RELATED APPLICATIONS

This application is a Continuation of and claims priority to U.S. patent application Ser. No. 12/127,648, filed on May 27, 2008 and now issued as U.S. Pat. No. 7,979,669, which is a Continuation of and claims priority to U.S. patent application Ser. No. 11/454,355, filed on Jun. 16, 2006 and now issued as U.S. Pat. No. 7,380,098, which is a Continuation of and claims priority to U.S. patent application Ser. No. 10/613,801, filed on Jul. 3, 2003 and now issued as U.S. Pat. No. 7,089,397, which are hereby incorporated by reference in their entirety.

FIELD

Embodiments relate generally to digital computer systems. More specifically, embodiments pertain to efficiently implementing translation between virtual addresses and physical addresses of a memory management system.

BACKGROUND

Many types of digital computer systems utilize memory caches in order to improve their performance and responsiveness. In typical computer systems, a memory cache typically comprises one or more memory banks that bridge main memory and the CPU. It is faster than main memory and allows instructions to be executed and data to be read at higher speed. The more commonly implemented caches include level 1 caches (e.g., L1), level 2 caches (e.g., L2), and translation look aside buffers (e.g., TLB). Generally, the L1 cache is built into the CPU chip and the L2 cache functions as a secondary staging area that feeds the L1 cache. Increasing the size of the L2 cache may speed up some applications but have no effect on others. The TLB is a cache matching virtual addresses with their corresponding physical address translations. The TLB is typically involved in the execution of most of the applications run on a typical computer system. Modern operating systems maintaining virtual memory make constant use of the TLB as they manage the virtual memory system. Accordingly, it is very important to the performance of the computer system that the data access paths that incorporate the TLB are as thoroughly optimized as possible. Since the TLB often incorporates attribute data in addition to the virtual address to physical address translations, what is required is a solution that can optimize the performance of the TLB with such attribute data in addition to the virtual address to physical address translations.

SUMMARY

Embodiments provide a method and system for caching attribute data for matching attributes with physical addresses.

BRIEF DESCRIPTION OF THE DRAWINGS

The accompanying drawings, which are incorporated in and form a part of this specification, illustrate embodiments, together with the description, serve to explain the principles of the disclosure.

DETAILED DESCRIPTION

Figure 1:
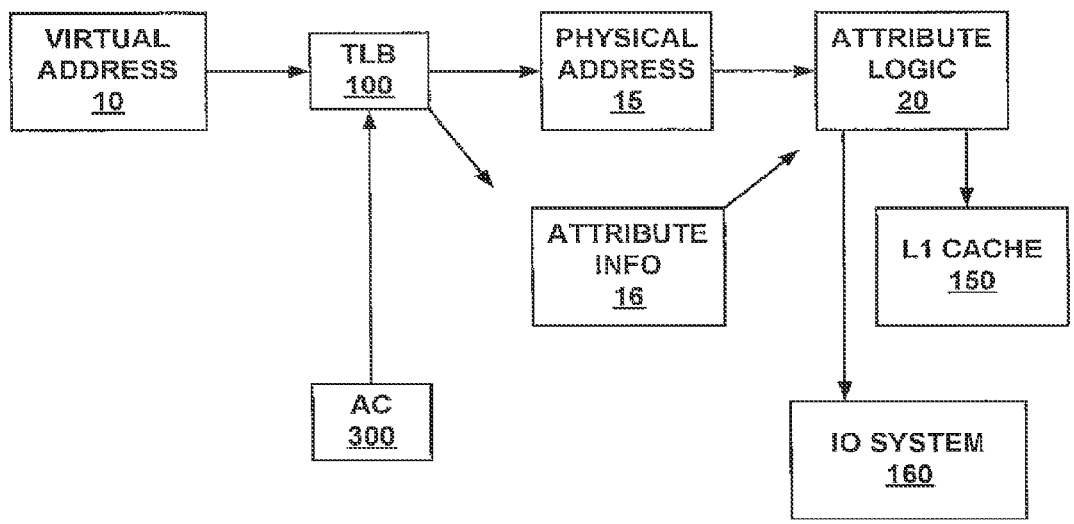
FIG. 1 shows a flow diagram showing the operation of a TLB having a parallel attribute cache within a computer system in accordance with one embodiment.

Reference will now be made in detail to embodiments, examples of which are illustrated in the accompanying drawings. While the disclosure will be described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description, numerous specific details are set forth in order to provide a thorough understanding. However, it will be recognized by one of ordinary skill in the art that embodiments may be practiced without these specific details.

Embodiments implement a method and system for caching attribute data for use with a translation look aside buffer. The method includes storing a plurality of TLB (translation look aside buffer) entries for the virtual address to physical address translations, wherein the entries include respective attributes. A plurality of attribute entries are stored in a memory (e.g., a cache), wherein the memory is configured to provide an attribute entry when that attribute entry is not stored in the TLB. In this manner, embodiments reduce the time penalty incurred on a TLB miss, when a page table must be accessed to obtain a physical address and when CPU cycles must be consumed looking up attributes for that physical address. By caching attributes for physical addresses, an attribute cache in accordance with an embodiment can significantly reduce the amount of time required to service a TLB miss. Embodiments and their benefits are further described below.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the disclosure, discussions utilizing terms such as "storing" or "accessing" or "providing" or "retrieving" or "translating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments

FIG. 1 shows a flow diagram showing the operation of a TLB 100 within a computer system in accordance with one embodiment. FIG. 1 shows a virtual address 10 being used to index a TLB 100 to obtain a corresponding physical address 15. The physical address 15 includes a number of attribute bits, or simply attributes, which are used to configure the manner in which the physical address will be handled by the computer system. The attribute bits appended to the physical address 15 are interpreted by attribute logic 20 which controls handling of the physical address with respect to the data caches, such as the L1 cache 150, and the I/O system 160 of the computer system. In the FIG. 1 embodiment, and attribute cache 300 is shown connected to the TLB 100.

The TLB 100 is used to cache a subset of the translations from a virtual address space to a physical addresses space. As is well known, when a TLB "hit" occurs, the physical address translation is rapidly returned by the TLB since the virtual address-to-physical address translation is stored as an entry in the cache. In addition to caching the physical address, the TLB stores with the physical address a plurality of attributes that are descriptive of the physical address.

The attributes describe different characteristics of the physical address. Such characteristics can include, for example, whether the physical address has previously been stored within the L1 cache 150, whether the physical address has previously been translated, whether the physical address resides within a disk cache, or whether the physical address has been accessed by some other machine process, or the like. By being aware of these attributes, the computer system can tailor its response to the physical address and avoid duplication of work or corruption of the data caches. These functions performed by the attribute logic 20.

The virtual address to physical address translation process is one of the most critical processes that occur within a computer system. It is very important to the overall performance of the computer system that the data path traversed to obtain a physical address from a virtual address be thoroughly optimized and execute as quickly as possible. Accordingly, it is important to minimize the amount of time consumed by the operation of the attribute logic 20 and the handling physical addresses in accordance with their attributes.

In the present embodiment, the attribute cache 300 is implemented as a "parallel" attribute cache. The attribute cache 300 functions by caching recently accessed attributes associated with the physical addresses stored within the TLB 100. The attribute cache 300 is a parallel attribute cache because it does not reside on the main data path that traverses the TLB 100, attribute logic 20, and the L1 data cache 150 and I/O system 160. Accordingly, the circuitry comprising the attribute cache 300 does not need to be as meticulously optimized, or as expensively implemented, as the circuitry of the other components that are on the main data path. The operation of the parallel attribute cache 300 is further described in FIG. 3 below.

Figure 2:
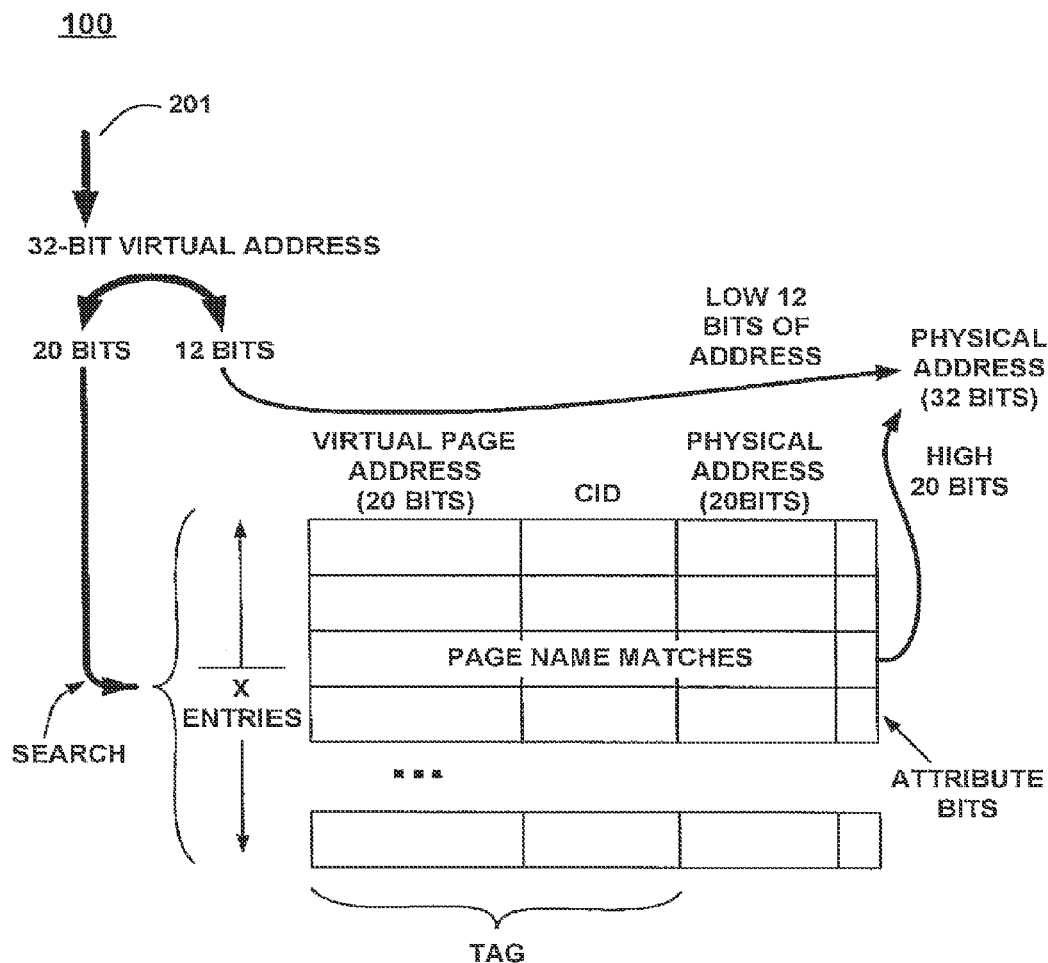
FIG. 2 shows a diagram showing the entries of the TLB in accordance with one embodiment.

FIG. 2 shows a diagram of the entries of the TLB 100 in accordance with one embodiment. An example wherein 32-bit addresses 201 are used is shown. As depicted in FIG. 2, the size of each page is $2^{12}$ bits (e.g., the lower 12 bits of an address) and the tag size is 20 bits (e.g., the upper 20 bits of an address). FIG. 2 also depicts the attribute bits appended to the end of each entry as shown.

It should be noted that embodiments are not limited to any particular 32-bit addressing configuration. For example, embodiments are equally applicable to 16-bit, 64-bit, etc. types of addressing configurations. Similarly, although the tags with which the TLB is indexed are shown as being 20 bits in length, embodiments are equally applicable to other configurations.

Generally, with virtual addresses comprising incoming 32-bit data words as shown, the most significant 20 bits (e.g., the page name) comprise a tag and are used to search the "x" number of entries of the TLB (e.g., 48 entries, 96 entries, or more) for tag matches (e.g., page name matches). The least significant 12 bits of the incoming virtual address indicate which byte of a page is addressed and become the least significant 12 bits of the physical address, as shown. The context identifier (CID), and other control bits, are included with both the 20 bits of the virtual page address and the 20 bits of the physical address. The output of the TLB is the most significant 20 bits and of the physical address, or sometimes referred to as the page frame address. Generally, the TLB 100 caches the most recent address translations. Thus, TLB misses usually result in the entries of the TLB 100 being updated with the more recent address translations.

Figure 3:
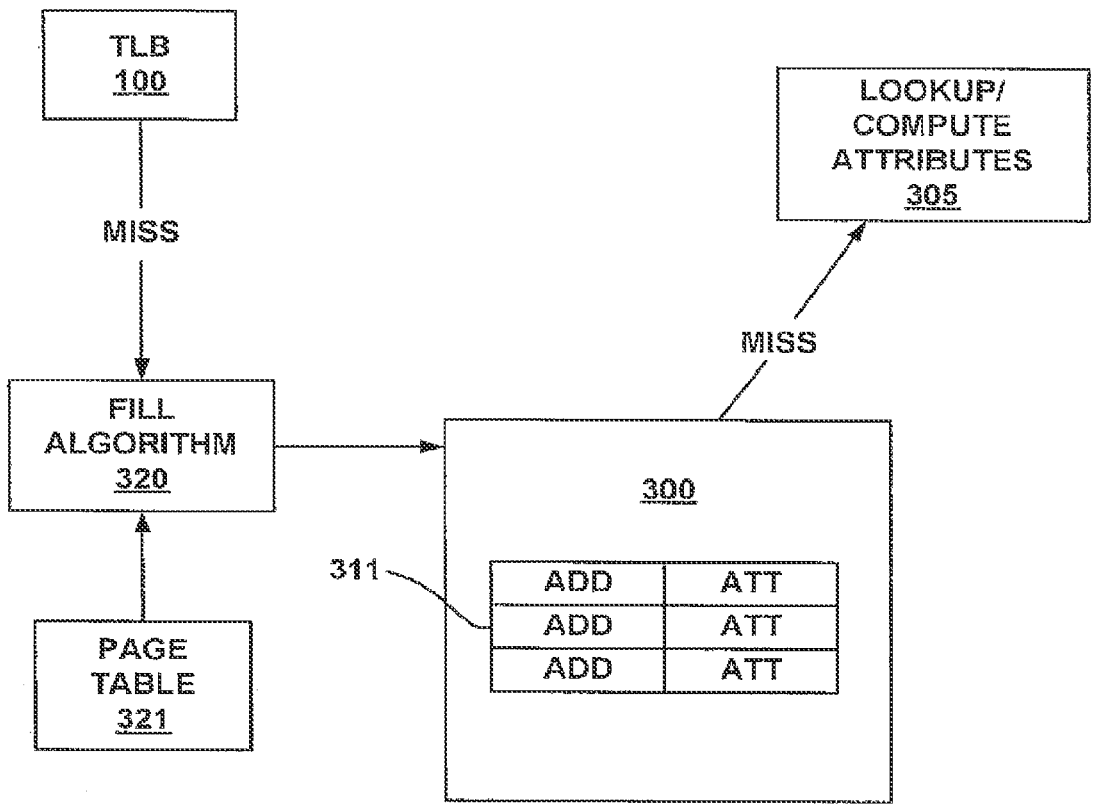
FIG. 3 shows a flow diagram depicting the operation of an attribute cache in accordance with one embodiment.

FIG. 3 shows a flow diagram depicting the operation of parallel attribute cache 300 in accordance with one embodiment. FIG. 3 depicts the operation of the attribute cache 300 in servicing a TLB miss.

As shown in FIG. 3, when a TLB miss occurs during a virtual address to physical address translation, a conventional page table walk is executed, where the computer system hardware walks the page table 160. The page table 160 is indexed with the virtual address and walked to obtain a corresponding physical address.

In the FIG. 3 embodiment, the physical address is used in conjunction with a plurality of attributes that are stored with (e.g., appended to) the physical address. The attribute cache 300 provides some, or all, (e.g., at least one) of these attributes for the physical address. As depicted in FIG. 3, the attribute cache 300 includes a number of entries 311 of physical addresses and their corresponding attributes. In the present embodiment, the attribute cache 300 is indexed with the physical address. Thus, when a physical address is obtained from the page table 160, instead of consuming CPU cycles looking up the attributes for that address, the attributes can be obtained from the attribute cache 300. These attributes are then returned to the TLB 100 along with the physical address.

Upon the occurrence of an attribute cache miss, the attributes are looked up or computed by the logic unit 305. In this case, the required attribute data does not reside in either the TLB 100 or the attribute cache 300. The attributes are looked up or otherwise computed by the logic 305 and then returned to the attribute cache 300 and the TLB 100 along with the physical address.

Thus, the attribute cache 300 provides a number of advantages for the computer system. Since the attribute cache stores only the attributes along with their corresponding physical addresses, as opposed to entire virtual addresses along with corresponding physical addresses (e.g., as in the TLB), the attribute cache can have a much larger number of entries in comparison to the TLB. This increases the chances that the attribute data will reside in the attribute cache even though the attribute data may have been previously flushed from the TLB. Additionally, since the attribute cache 300 is accessed only on TLB misses, the turnover of entries within the attribute cache 300 is less than that of the TLB. To further increase performance, a designer can configure the attribute cache 300 to cache those physical attributes of physical addresses which are most time-consuming to obtain. Thus, the physical attributes that cannot be quickly computed would be the most likely candidates for inclusion in the attribute cache 300. Such examples include, a translation bit indicating whether a translation has been performed on a corresponding entry, or a cache status bit indicating a cache status of the corresponding entry, or the like.

Optionally, in one embodiment, the attribute cache 300 is speculatively loaded to anticipate future TLB misses. For example, upon the occurrence of an attribute cache miss, the logic unit 305 can be consulted to lookup/compute the attributes, and then lookup/compute the attributes for a plurality of additional physical addresses. These additional physical addresses have not yet been requested by the TLB, but are speculatively looked up in anticipation of a subsequent TLB access. In this manner, the attribute cache 300 can optionally speculate on subsequent accesses by the TLB in an attempt to reduce the amount of time in obtaining attributes.

Figure 6:
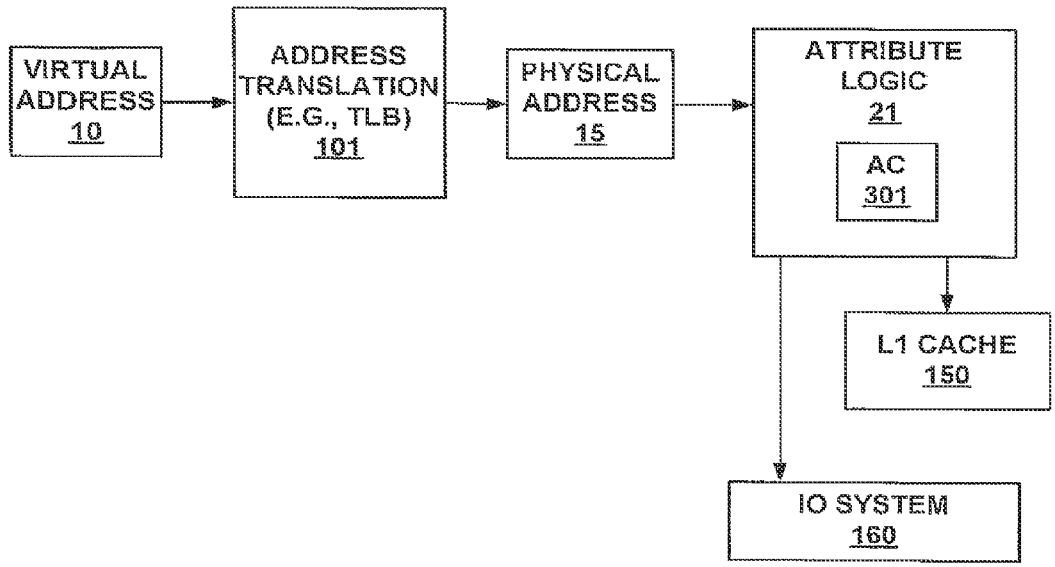
FIG. 6 shows a flow diagram showing the operation of a TLB having a serial attribute cache within a computer system in accordance with one embodiment.
Figure 7:
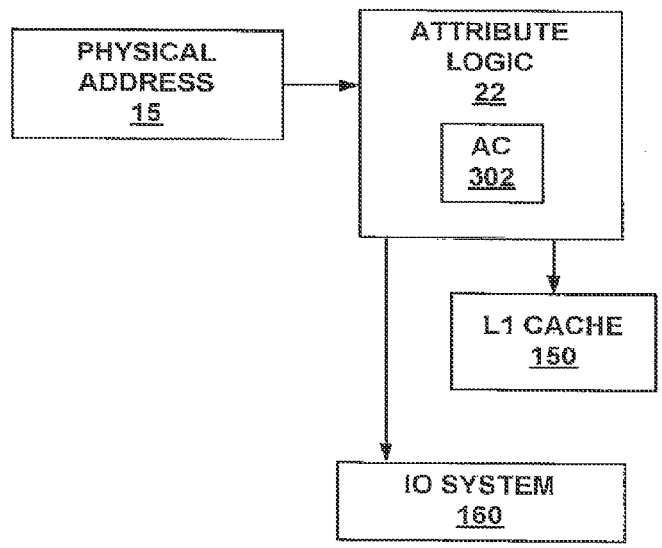
FIG. 7 shows a flow diagram showing the operation of a basic attribute cache within computer system in accordance with one embodiment.

FIG. 6 and FIG. 7 below show diagram depicting the operation of a "serial" version of an attribute cache and a basic version of an attribute cache in accordance with embodiments.

Figure 4:
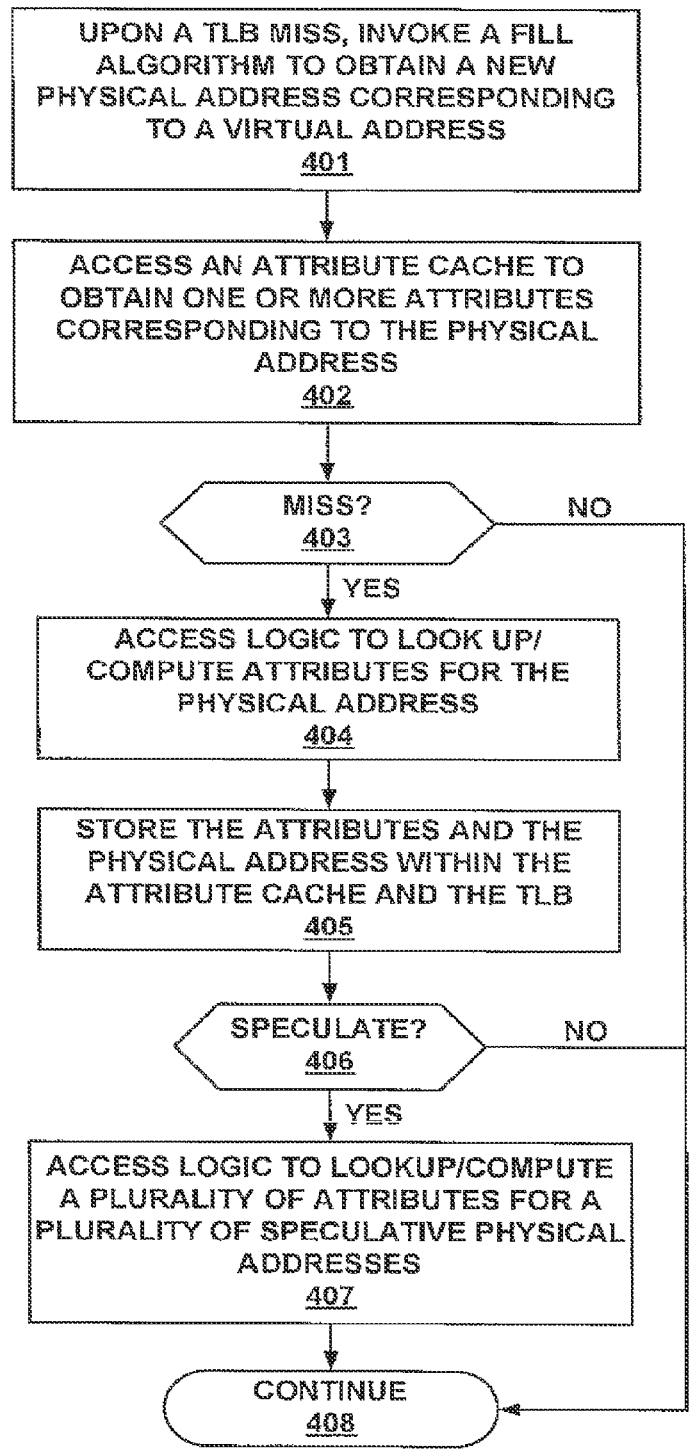
FIG. 4 shows a flowchart of the steps of a process for caching physical attributes for use with a TLB in accordance with one embodiment.

Referring now to FIG. 4, a flowchart of the steps of a process 400 for caching physical attributes for use with a TLB in accordance with one embodiment is shown.

Process 400 begins in step 401, where, upon a TLB miss, a page table 160 is accessed to obtain a new physical address corresponding to a virtual address. In step 402, an attribute cache 300 is accessed to obtain one or more attributes corresponding to the physical address retrieved from the page table 160. In step 403, in the case of the attribute cache miss, process 400 proceeds to step 404 where logic 305 is accessed to lookup/compute the attributes for the physical address. In step 405, the attributes and the physical address are stored within the attribute cache 300 and the TLB 100. In step 406, in the case of speculative loading of the attribute cache, the logic 305 is accessed to lookup/compute a plurality of attributes for plurality of speculative physical addresses. Subsequently, process 400 continues in step 408.

Computer System Platform

Figure 5:
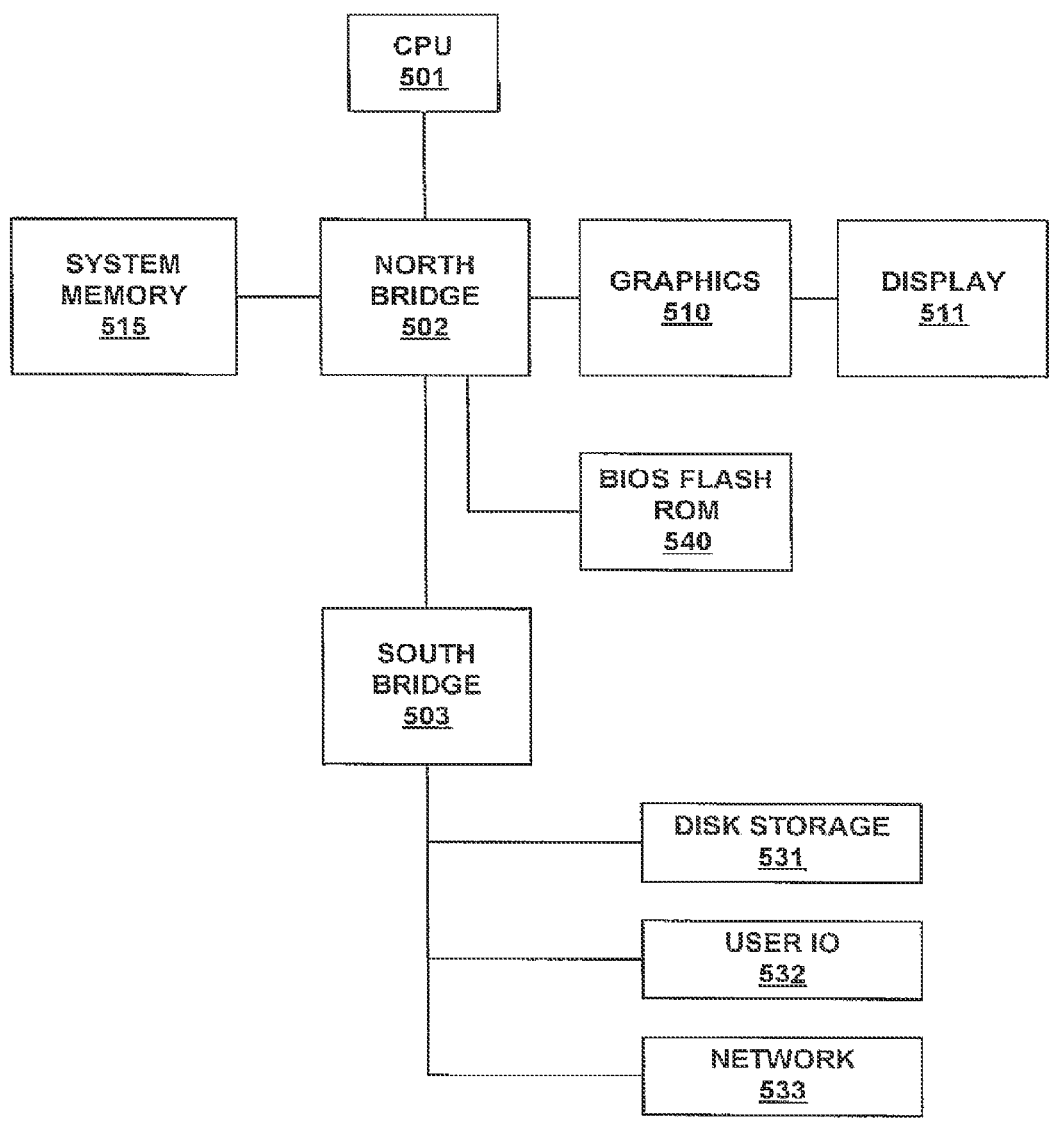
FIG. 5 shows a diagram of a computer system in accordance with one embodiment.

With reference now to FIG. 5, a computer system 500 in accordance with one embodiment is shown. Computer system 500 shows the general components of a computer system in accordance with one embodiment that provides the execution platform for implementing certain software-based functionality of embodiments. As described above, certain processes and steps are realized, in one embodiment, as a series of instructions (e.g., software program) that reside within computer readable memory units of a computer system (e.g., system 500) and are executed by the CPU 501 of system 500. When executed, the instructions cause the system 500 to implement the functionality as described above.

In general, system 500 comprises at least one CPU 501 coupled to a North bridge 502 and a South bridge 503. The North bridge 502 provides access to system memory 515 and a graphics unit 510 that drives a display 511. The South bridge 503 provides access to a plurality of coupled peripheral devices 531 through 533 as shown. Computer system 500 also shows a BIOS ROM 540 that stores BIOS initialization software.

FIG. 6 shows a diagram depicting the operation of a "serial" version of an attribute cache 301 in accordance with one embodiment. As depicted in FIG. 6, in a serial attribute cache implementation, the attribute cache lies within the attribute logic 21 and resides on the main data path of the virtual address to physical address translation process.

In the FIG. 6 embodiment, the circuitry of the attribute cache 301 is optimized such that it can perform and function at the high speeds of the other components on the main data path (e.g., TLB 101, attribute logic 21, L1 data cache 150, etc.). The FIG. 6 embodiment provides the advantage that the TLB 101 can be much simpler TLB, such as, for example, a basic memory management unit, in comparison to a fully implemented TLB 100 of FIG. 1. In other respects, with respect to caching physical addresses and their matching attributes, the serial attribute cache 301 functions in a manner a substantially similar to the parallel attribute cache 300 of FIG. 1.

FIG. 7 shows a diagram depicting the operation of a "basic" version of an attribute cache 302 in accordance with one embodiment. As depicted in FIG. 7, in a basic attribute cache implementation, there is no TLB, or otherwise similar component (e.g., memory management unit, etc.) included in the architecture. In the FIG. 7 embodiment, the physical addresses are directly received by the attribute logic 22 which accesses the attribute cache 302 to generate/lookup the attributes for the physical address (e.g., physical address 15). The FIG. 7 embodiment provides an advantage in that it is relatively straightforward and inexpensive to implement. Thus, for example, the basic version of the attribute cache 302 would be well-suited for use in embedded applications that place the premium on low-cost and comparative ease of manufacture. In other respects, with respect to storing physical addresses with their matching attributes, the basic attribute cache 302 functions in a manner substantially similar to parallel attribute cache 300 of FIG. 1.

The foregoing descriptions of specific embodiments have been presented for purposes of illustration and description. They are not intended to be exhaustive or to limit the disclosure to the precise forms disclosed, and many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is intended that the scope of the disclosure be defined by the Claims appended hereto and their equivalents.

What is claimed is:

1. A computer-readable non-transitory storage device comprising computer-executable instructions stored therein, the computer-executable instructions for performing operations comprising:

accessing an attribute cache to obtain at least one attribute corresponding to a physical address in response to a translation look aside buffer (TLB) miss;

accessing a logic to compute the at least one attribute for the physical address in response to a miss during the accessing the attribute cache; and storing the at least one attribute and the physical address within the attribute cache.

2. The computer-readable storage device of claim 1, further comprising:

storing the at least one attribute and the physical address within a translation look aside buffer (TLB).

3. The computer-readable storage device of claim 2, wherein the attribute cache comprises a greater number of entries than the TLB.

4. The computer-readable storage device of claim 1, wherein the attribute cache is operable to cache a first plurality of attributes that are time-consuming to obtain.

5. The computer-readable storage device of claim 1, further comprising:

determining whether the attribute cache is configured for speculatively loading of a plurality of attributes for a plurality of speculative physical addresses.

6. The computer-readable storage device of claim 5, further comprising:

responsive to the attribute cache being configured for speculatively loading, accessing the logic to compute the plurality of attributes for the plurality of speculative physical addresses.

7. The computer-readable storage device of claim 6, further comprising:

storing the plurality of attributes and the plurality of speculative physical addresses within the attribute cache.

8. A cache memory, comprising:

means for storing attributes that correspond to physical addresses, wherein the means for storing is accessed in response to a translation look aside buffer (TLB) miss; and means for receiving a physical address and generating at least one attribute for the physical address to store in the means for storing.

9. The cache memory of claim 8, wherein the means for storing is configured to support speculative attribute lookups to obtain a plurality of attribute entries for a plurality of speculative physical addresses.

10. The cache memory of claim 8, further comprising:

means for supporting an attribute lookup to obtain an attribute entry if the attribute entry is unavailable in the means for storing.

11. The cache memory of claim 8, wherein the means for storing includes a plurality of attribute entries that are indexed with physical addresses.

12. The cache memory of claim 8, wherein the at least one attribute is a translation bit that indicates whether a translation has been performed on a corresponding physical address.

13. The cache memory of claim 8, wherein the at least one attribute is a cache status bit that indicates a cache status of a corresponding physical address.

14. A system, comprising:

a processing device; and a cache memory coupled to the processing device, wherein the cache memory includes:

an attribute cache operable to store attributes that correspond to physical addresses, wherein the attribute cache is accessed in response to a translation look aside buffer (TLB) miss; and attribute logic operable to receive a physical address and operable to generate at least one attribute for the physical address to store in the attribute cache.

15. The system of claim 14, further comprising a translation look aside buffer (TLB) coupled to the processing device.

16. The system of claim 15, wherein the attribute cache is in a parallel arrangement with respect to the TLB and the attribute logic.

17. The system of claim 15, wherein the attribute cache is in a serial arrangement with respect to the TLB and the attribute logic.

18. The system of claim 15, wherein the attribute cache comprises a greater number of entries than the TLB.

19. The system of claim 14, further comprising:

a system memory coupled to the processing device.

20. The system of claim 14, further comprising:

a north bridge coupled to the processing device; and a south bridge coupled to the processing device.

\* \* \* \* \*